Dec. 24, 1940.                  E. SPICKELMIER ET AL                  2,226,360
                                  HAT PROCESSING MACHINE
                             Filed March 29, 1939         5 Sheets-Sheet 1
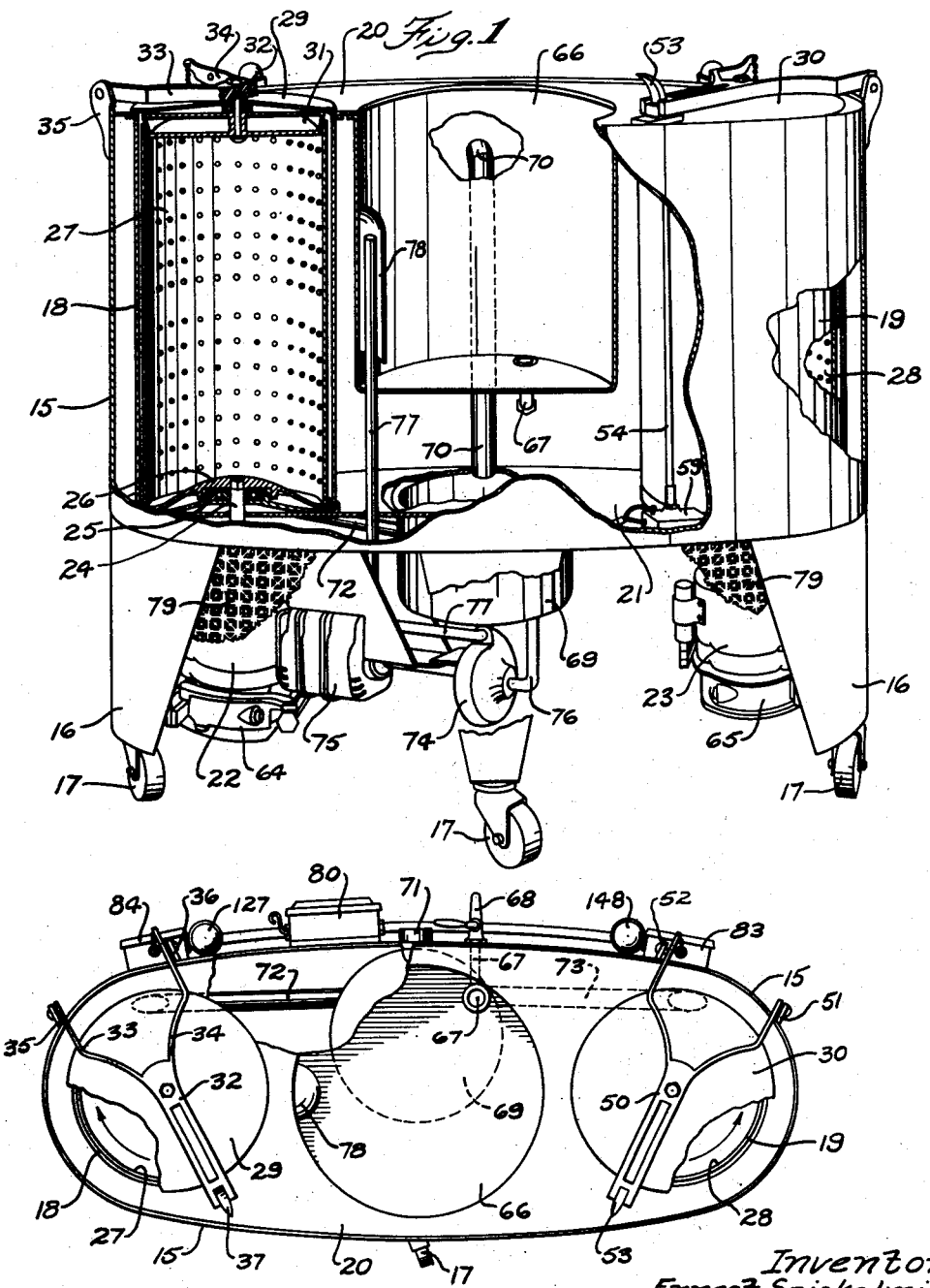
Inventors
Ernest Spickelmier,
Carl W. Bruenger and
Forrest L. Hitchcock,
By Minturn & Minturn
Attorneys

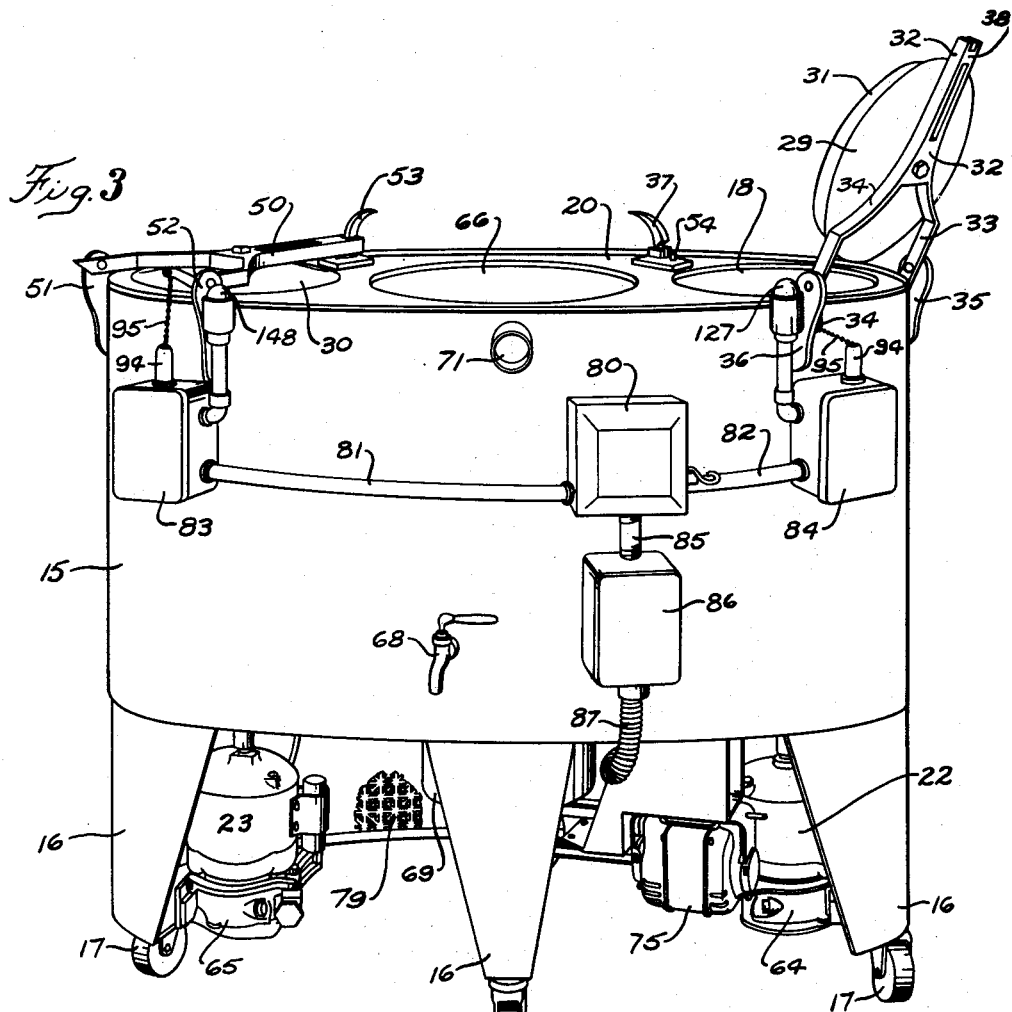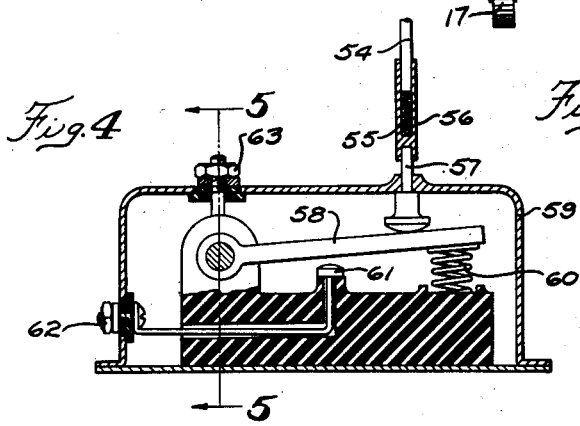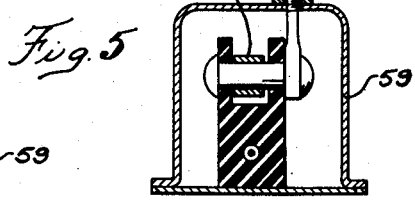

Dec. 24, 1940.    E. SPICKELMIER ET AL    2,226,360
HAT PROCESSING MACHINE
Filed March 29, 1939    5 Sheets-Sheet 3

Inventors
Ernest Spickelmier,
Carl W. Bruenger and
Forrest L. Hitchcock,
By Minturn & Minturn,
Attorneys

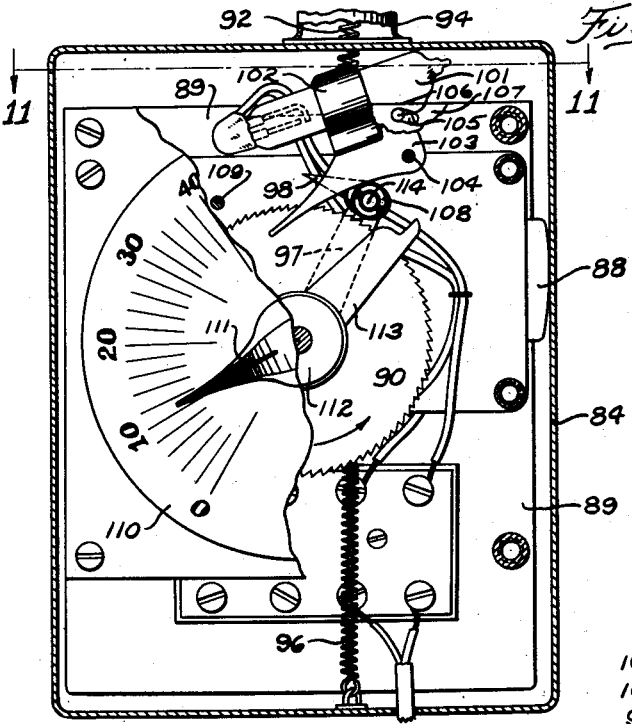
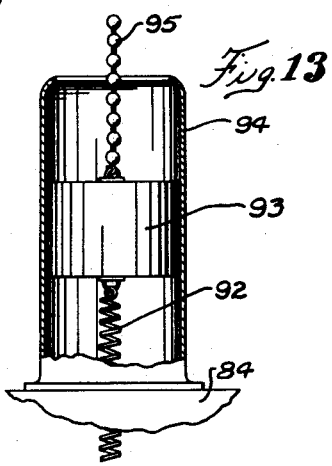
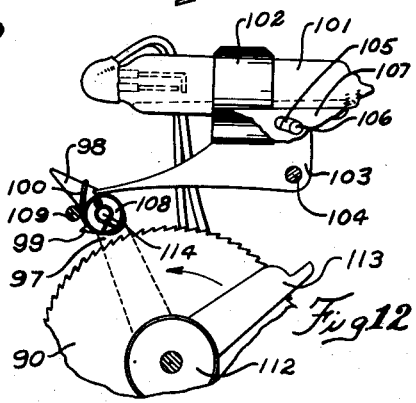
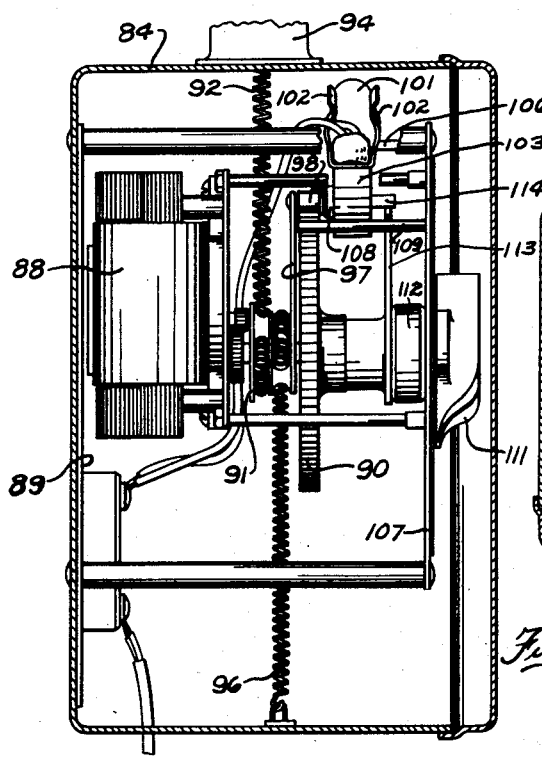
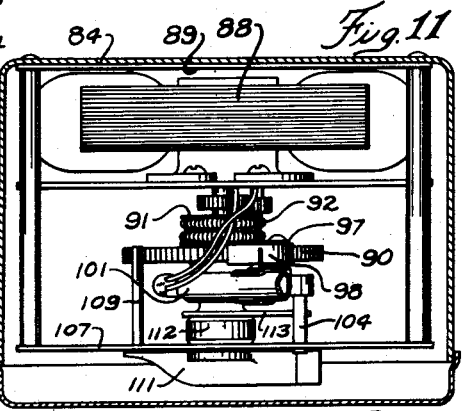

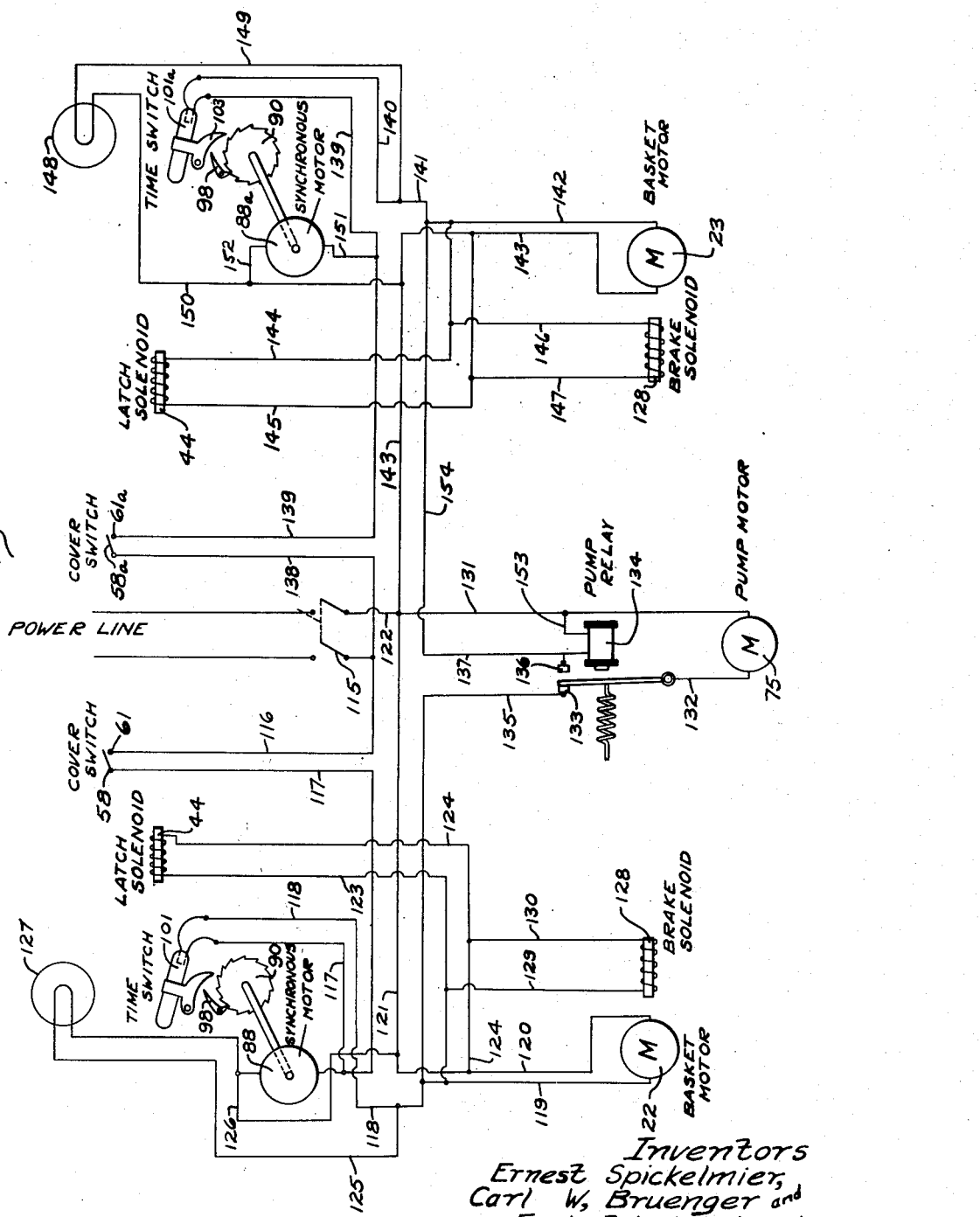

Patented Dec. 24, 1940

2,226,360

UNITED STATES PATENT OFFICE 2,226,360

HAT PROCESSING MACHINE

Ernest Spickelmier, Carl W. Bruenger, and Forrest L. Hitchcock, Indianapolis, Ind., assignors to Spickelmier Fuel and Supply Company, Indianapolis, Ind., a copartnership composed of Ernest Spickelmier, Carl V. Spickelmier, and Fred J. Spickelmier Application March 29, 1939, Serial No. 264,870

7 Claims. (Cl. 91—42)

This invention relates to a machine for subjecting articles, such as hats or the like, to treatment with liquids containing volatile constituents, one particular application of the invention being the waterproofing of felt hats with a liquid containing a vehicle or carrier such as carbon tetrachloride which carries the waterproofing ingredients.

An important object of the invention is to provide a unitary, compact machine in which the articles being treated may be immersed and then subjected to a drying step wherein the waterproofing vehicle or the like and surplus liquid may be extracted from the hats and recovered and made available for use, all without escape of fumes and vapors from the machine, and returning automatically to the immersion tank all of the recovered liquids.

A still further important object of the invention is to provide a structure fully protected with safeguards so arranged so that the machine may not be operated under conditions dangerous to the operator.

A still further important object of the invention is to provide a structure which becomes automatically operable upon closure thereof and is restored to an inoperative position upon opening whereby a great saving of time is effected.

Figure 6:
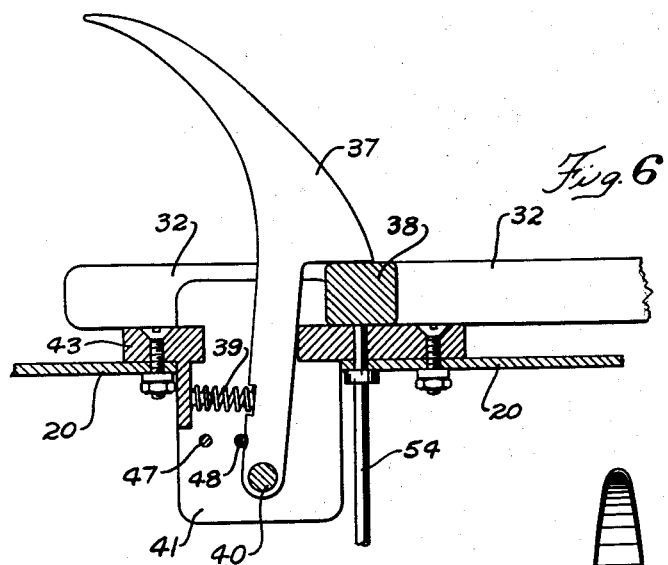
Figure 7:
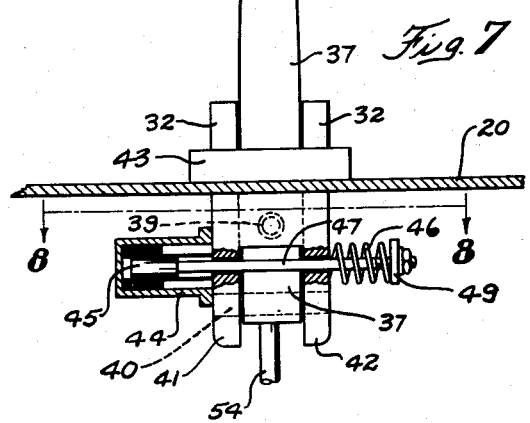
Figure 8:
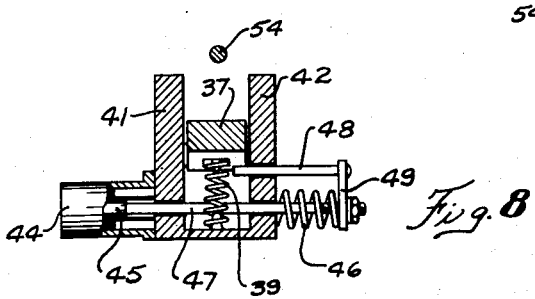

These and many other objects and advantages of the invention, such as the unique and novel association of the various elements as set forth in the appended claims, will become apparent to those versed in the art in the following description of one particular form of the invention as illustrated more or less diagrammatically in the accompanying drawings, in which Fig. 1 is a front elevation in partial section of a machine embodying the invention;

Fig. 2, a top plan view;

Fig. 3, a rear elevation;

Fig. 4, a detail on enlarged scale in vertical section of a start and stop switch;

Fig. 5, a transverse section on the line 5—5 in Fig. 4;

Fig. 6, a detail in section of a cover latch mechanism;

Fig. 7, a rear elevation of the structure shown in Fig. 6;

Fig. 8, a section on the line 8—8 in Fig. 7;

Fig. 9, a front elevation in partial section of the timing mechanism;

Fig. 10, an end elevation;

Fig. 11, a transverse section on the line 11—11 in Fig. 9;

Fig. 12, a detail in front elevation on enlarged scale of the timer switching mechanism;

Fig. 13, a detail in partial section on enlarged scale of the cover-timer connection; and Fig. 14, a wiring diagram of the controls employed.

Like characters of reference indicate like parts throughout the several views of the drawings.

A general housing 15 is mounted upon suitable legs 16, herein shown as four in number, each leg preferably carrying a caster 17 where the machine is not intended to be anchored in a fixed position. The housing 15 in horizontal transverse section is approximately elliptical in shape and carries therewithin tanks 18 and 19 respectively, toward the ends of the housing 15. Each tank 18 and 19 is cylindrical in nature and opens at its top end through the cover plate 20 of the housing 15.

Suspended under the floor 21 of the housing 15 under each of the tanks 18 and 19 are electric motors 22 and 23 respectively, each being mounted vertically to have a shaft 24 extending from the motor vertically up through the floor 21 and through the bottom of the floor of the tanks. As indicated in Fig. 1, in reference to the tank 18, the shaft 24 extends through a suitable bearing 25 and into driving engagement with the floor 26 of a cylindrical basket 27 carried freely within the tank 18. Preferably both the floor of the tank 18 and the floor of the basket 27 are convexly formed. The basket 27 is insertable into the tank 18 by entering the basket through the top opening of the tank and carrying it downwardly to have the floor 26 rest upon the bearing 25 and removably engage with the driving end of the projecting shaft 24.

The same structure applies in reference to the tank 19 wherein the basket 28 is likewise carried and driven by its motor 23.

Covers 29 and 30 are provided respectively for substantially gas sealing the tanks 18 and 19. Each cover is provided with a downwardly projecting portion 31 shaped to enter within the upper open end of the basket as a means for steadying the basket during starting and stopping operations of the driving motors in order to prevent the baskets from rubbing against the walls of the tanks. The cover 29 is mounted upon an arm 32, the legs 33 and 34 of which are individually hinged through ears 35 and 36 respectively, to the housing 15. By lifting the arm 32, the cover 29 is likewise lifted and may be swung back out of the way, as indicated in Fig. 3, when access is desired to the tank and basket. The leg 34 extends rearwardly beyond the ear 36 so that it will strike the vertical wall of the tank 15 and thus limit the rearward swing of the arm.

The arm 32 extends forwardly beyond the cover 29 to engage under a latch 37 as a means of holding the cover 29 in a closed position. The latch is indicated in detail in Figs. 6–8, the latch in the specific form herein shown engaging a cross bar 38 carried between bifurcated members of the arm 32. A spring 39 normally urges the latch 37 into engagement with and over the bar 38, the latch being hinged on a pin 40 extending between ears 41 and 42 from a mounting bracket 43 which is secured to the housing top 20. The latch 37 is provided with an electric solenoid holding mechanism for the purpose of maintaining the latch in the engaged position when the machine is in operation or rather when that particular basket is being rotated under the cover being held closed by the latch. Of course, the holding mechanism may assume any number of forms, the one particular form herein shown consisting of a solenoid 44 carried on the ear 41 with a shiftable armature 45 extending slidably across through the other ear 42 and carrying a compression spring 46 normally holding the armature 45 to one end of the solenoid. The rod 47, which connects with the armature 45 and about which the spring 46 is carried, Figs. 7 and 8, carries a pin 48 by means of a cross bar 49 slidably in the ear 42 in a path immediately behind the latch 37 when in its engaging position. Thus when the solenoid 44 is energized, the armature 45 will be pulled to the left, Figs. 7 and 8, to pull the pin 48 behind the latch 37 and thus prevent movement of the latch away from engagement with the bar 38 of the arm 32. De-energizing of the solenoid 44 will permit the spring 46 to return the pin 48 to an outer position out of the path of the latch 37 so that the latch is then free to be swung in opposition to the spring 39.

The same structure applies to the cover 30 which is mounted on its carrying arm 50 hinged through the ears 51 and 52 to the housing 15 and having its hold-down latch 53, this latch 53 having a solenoid operated holding mechanism as indicated in Figs. 6–8 above described.

Under each of the cover carrying arms 32 and 50 adjacent the holding latches 37 and 53 is an end of a rod 54 to be in the path of the arm, herein shown, Fig. 6, as being in the path of the cross bar 38. This rod 54 in each instance extends downwardly to operate some type of switch interposed in the circuit controlling the operation of the respective motors 22 and 23. While this switch in each instance may take a number of forms, it is illustrated more or less diagrammatically in Figs. 4 and 5 in one particular form wherein the rod 54 interconnects through a resilient member, such as the spring 55 carried in a sleeve 56 with a push button 57 bearing against the switch arm 58 inside of a housing 59 normally held by a spring 60 in an open circuit position removed from a contact member 61 which carries an external terminal 62, the switch arm 58 being interconnected with an external terminal 63. As long as either cover is open, the control rod 54 is held in an upper position and the switch is in open condition. In other words when the cover is open, current to the motor which drives the basket in that open tank is cut off. Each motor 22 and 23 is provided with a brake mechanism 64 and 65 respectively, automatically operable through solenoids immediately prior to the opening of the respective covers as will more fully be described later.

Between the two tanks 18 and 19 and within the housing 15 is mounted a central immersion tank 66 opening through the top 20. For drainage purposes, a pipe 67 leads from the floor of this immersion tank 66 downwardly and laterally out through the side of the housing 15 to a stopcock 68.

Immediately below the tank 66 is a sump or collecting tank 69, herein shown as being suspended from the floor 21 of the housing 15, the floor 21 forming a top closure for the tank. A vent pipe 70 is provided to have its lower end open through the floor 21 into the tank 69 and extend upwardly therefrom within the housing 15 and turn by its upper end outwardly through the rear side of the housing 15 to have an external discharge port 71.

Drain pipes 72 and 73 lead respectively from the floors of the tanks 18 and 19 and discharge into the collecting tank 69. It is to be noted that the inlets to these drain pipes 72 and 73, Fig. 2, are located to be roughly tangential to the baskets 27 and 28 and to be in those positions wherein fluid is urged by reason of travel of the baskets as indicated by the arrows in Fig. 2. A pump 74 of any suitable design, herein shown as being of a centrifugal type, is carried under the floor 21 to be driven by an electric motor 75 and to take fluid from the tank 69 through the intake pipe 76 and discharge it through the pipe 77 into the immersion tank 66, the outlet of the pipe 77 being carried up under a baffle 78, the baffle 78 being open at its lower end and closed over in respect to the wall of the tank 66, whereby the opening from the baffle 78 is normally submerged in the fluid carried in the tank 66 and any fumes being liberated do not escape from the top of the tank 66 but are entrapped and returned to the fluid, and furthermore, little agitation of the fluid in the tank 66 is effected by this means of discharge behind the baffle.

For the sake of appearance as well as adding a safety factor, a suitable grille 79 is employed as a skirt below the housing 15 and between the legs 16 across the front side of the machine. All of the motor drives are located under the floor 21 and behind this protecting grille.

On the rear side of the housing 15 is fixed a main control switch box 80. From this switch box leads conduits 81 and 82 respectively, to the timer housing boxes 83 and 84. A third conduit 85 leads downwardly to a relay and distribution box 86 from which a conduit 87 carries wiring to the various motors and controls. A separate timing mechanism is carried in each of the boxes 83 and 84 and are identical in all respects. Therefore a description of one timing mechanism will be sufficient and this description is made in reference to the timer carried in the box 84.

Referring to Figs. 9–13, a synchronous motor 88 is mounted upon a base 89 secured inside of the housing 84 to drive through any suitable gear reduction and toothed wheel 90, this wheel 90 being fixed to the motor driving shaft. Also carried on the motor driving shaft is a pulley 91 loosely mounted thereon. In the form herein shown, a spring 92 has one end fixed to the pulley 91 to be wrapped therearound from the under-side and carried upwardly from the right-hand side to pass outwardly through the box 84 and connect with a piston 93 freely fitted in a cylinder 94, Fig. 13, the piston being free to be shifted vertically within the cylinder 94 and being prevented from being withdrawn from the upper end by any suitable stop, such as by crimping over the wall of the cylinder. The piston 93 is supported by means of any suitable linkage with the rearwardly extending foot 34 of the cover arm 75

32, this linkage in the present form being shown as a ball type chain 95.

A second spring 96 has one end fixed to the pulley 91 and is wrapped around the pulley and carried downwardly from the same side as the spring 92 is carried upwardly. The lower end of the spring 96 is fixed in any suitable manner, such as by engaging the floor of the box 84. The springs 92 and 96 are of the usual type commonly employed for resilient belting, the spring 92 requiring more force to extend it than is required to extend the spring 96, that is, the spring 96 is lighter than is the spring 92.

Fixed to the shiftable pulley 91 is an arm 97 to be rockable therewith. This arm 97 extends radially along the rear face of the wheel 90 and rockably carries a pawl 98 near its outer end to have the pawl in the path of the peripheral teeth on the wheel 90. This pawl has an under tooth 99 for wheel tooth engagement and a spring 100 normally rocks the pawl 98 to carry this tooth 99 into the path of the teeth.

Mounted in any suitable position, herein shown as being above and forward of the wheel 90, is a mercury switch 101 carried between clips 102 on a rocker 103. The rocker is free to rock about its pivot pin 104 within the limits of the slot 105 as determined by the pin 106 entering that slot, the slot 105 being formed in a front supporting plate 107.

The rocker 103 is in the path of a roller 108 carried on the arm 97 at the side of the pawl 98. The arrangement is such that when the arm 97 brings the roller 108 around clockwise, Figs. 9 and 12, the rocker 103 is lifted from the position shown in Fig. 9 to the extreme position shown in Fig. 12 to throw the mercury switch 101 from a closed circuit position to an open circuit position. The counter-clockwise travel of the arm 97 is limited by a pin 109 extending rearwardly from the front support plate 107. This pin 109 further serves to lift the pawl 98 to remove its tooth 99 from engagement with the teeth of the wheel 90. This shifting of the pawl 98 is accomplished by reason of an upper arm of the pawl 98 striking the pin 109 and traveling thereover as the arm 97 is swung toward the pin, as illustrated particularly in Fig. 12. This lifting movement is accomplished by reason of the radial location of the pin 109 from the center of rotation of the wheel 90 and by the relatively sloping under-face of the pawl arm.

The plate 107 carries an indicating dial 110 on its front face over which a pointer 111 may be manually swung. This pointer 111 is rockably mounted on the shaft of the motor 88 to be free to turn thereon. A hub 112 extends from the pointer 111 inwardly through the plate 107 and carries in fixed relation thereto an arm 113 so that as the pointer 111 is rotated the arm 113 behind the plate 107 will likewise be rotated. The outer end of the arm 113 is in the path of the shaft 114 on which the pawl 98 of the roller 108 are mounted.

Operation

The operation of the machine and process is as follows: A quantity of fluid employed in the treating process is placed in the immersing tank 66. Both covers 29 and 30 are lifted to their open positions and the main switch 115, Fig. 14, in the box 80 is closed. The articles to be treated, hats for example (not shown), are dipped one at a time in the fluid in the tank 66 and stacked one over the other in either basket 27 or 28, basket 27 being selected for the present example of operation. When the desired number of articles are placed in the basket 27, the cover 29 is lowered to bring the arm 32 down into latching engagement with the latch 37. This closing of the cover performs a multiple number of operations. In the first place, the pointer 111 on each of the timers is turned around to that indication for the desired time of running of the basket 27. This shifting of the pointer 111 sets the arm 113 accordingly. The spring 92 is in the slack position while the cover 29 is open and the spring 96 will have pulled the arm 97 around clockwise to maintain the shaft 114 against the limit arm 113.

When the cover 29 is closed, it pushes downwardly on the rod 54 to close the switch arm 58 against the contact member 61, this action completing a circuit from the switch 115, Fig. 14, through the wire 116, wire 117, switch 101, wire 118, wire 119, basket drive motor 22, wire 120, wire 121, and wire 122. Simultaneously a circuit is established through the latch solenoid 44 from the wire 119, through the wires 123 and 124, thus retaining the latch 37 in the closed position and preventing opening of the cover 29.

Also a circuit is closed from the wire 118, through the wires 125 and 126 to a pilot lamp 127 to indicate running of the basket 27. Another circuit is closed from the wire 117 through the synchronous motor 88 and the wire 126 setting that motor into operation to drive the toothed wheel 90 in a counter-clockwise direction, Figs. 9-12 (clockwise in Fig. 14). A still further circuit is closed through the brake solenoid 128, through the wires 129 and 130 which are parallelly connected with the motor 22. This brake solenoid 128 operates in the usual and well known manner to hold the brake 64 of the motor 22 in a released condition. One more circuit is closed between the switch 115 and the pump motor 75 through the wire 122, wire 131, wire 132, front contact 133 of the relay 134, and wire 135 connected to the wire 118 and thus through the switch 101 and cover switch members 58 and 61.

The basket 27 is brought up to speed by the motor 32 to rotate to throw out centrifugally excess fluid from the articles contained in the basket. As this fluid is thrown out, it drains to the floor of the tank 18 and flows by gravity down through the drain pipe 72 into the sump 69 from which it is pumped by the pump 74 back into the immersion tank 66. Since the solvent or vehicle employed in this fluid in the present instance is carbon tetrachloride, fumes or vapors escaping therefrom inside of the tank 18 cannot escape by reason of the cover 29 being closed, such vapors being in any event heavier than air and tending to drop to the bottom of the tank. This action is facilitated by reason of the rapidly rotating basket 27 which tends to throw the vapors against the wall of the tank 18 where they condense and flow downwardly and out as liquid. The vent pipe 70 equalizes any slight difference in pressure there may be but since the material vaporizes and condenses within the same system, there is no differential in pressure as between the atmosphere and the tanks so that as a matter of fact no vapors travel upwardly through the vent pipe 70.

Going back to the timing mechanism, travel of the toothed wheel 90 is counter-clockwise as viewed in Figs. 9-12. Since the spring 92 is in a stretched condition, by reason of its attachment to the foot 34 of the cover arm 32, the arm 97 as fixed to the pulley 91 will tend to be pulled around in a counter-clockwise direction, but the rate of travel is limited by the rate of travel of the wheel 90 as driven by its motor 88, the reduction gearing between the motor and the shaft carrying the wheel 90 being sufficient as to prevent any appreciable change in speed of the motor shaft through pull of the spring 92. The arm 97 continues to travel until the pawl 98 is lifted from engagement with the wheel 90 by riding over the pin 108. By this time, the rocker 103 has been shifted to throw the switch 101 to an open circuit position. This action interrupts the circuit to shut off flow of current to the motor 22, brake solenoid 128, and latch solenoid 44, thus allowing the brake to be automatically applied to the motor 22 to rapidly reduce the speed of and stop the motor 22 and bring the basket 27 to a standstill and also to permit shifting of the latch 37 so that the cover 29 may then be opened. The pilot lamp 127 is extinguished since its circuit is also interrupted by the switch 101. The synchronous motor 88 continues to run independently of the switch 101 until the cover 29 is lifted to permit separation of the contact members 58 and 61. The pump motor 75 is thrown out of the circuit by the switch 101 so that the pump stops upon stoppage of the basket motor 22. Lifting of the cover 29 permits the lower spring 96 of the timer to reset the arm 97 clockwise against the arm 113 so that the timing mechanism is then ready for a subsequent operation.

After the basket 27 has been loaded and set into operation as above described, the basket 28 in the tank 19 is immediately loaded in the same manner. The period of running of either basket is ordinarily made to be such that the operator has time to load one basket and close its cover while the other basket is running so that he is following the steps of loading first one basket, and then unloading the second basket and re-loading it, and so on.

Since the operation and controls are substantially identical for both baskets, the above description in reference to basket 27 and its various motors, solenoids, etc., the same description will apply in reference to the same elements in connection with the basket 28. The only difference in operation comes in the control of the pump motor wherein the relay 134 is energized to change the circuit from the wire 132 to the back contact 136, through the wire 137, to the switch 101a, and so on back to the main control switch 115. It is to be noted that in this instance, when the cover 30 is closed, switch members 58a and 61a are closed through its control rod 54 to complete a circuit from the switch 115 to the wires 138, 139, switch 101a, wires 140, 141, 142, motor 23, and wire 143 for the basket motor 23; the latch solenoid through the wires 144 and 145 and brake solenoid through the wires 146 and 147, both connected respectively to the wires 142 and 143, through the wires 149 and 150 respectively; the synchronous motor 88a to the wires 151 and 152 between the wires 139 and 150 respectively; and the pump relay 134, the wires 153 and 154 respectively connected to the wires 131 and 141.

Thus it is to be seen that a very simple process and machine are provided. While the machine has been herein shown in the one particular form, it is obvious that structural variations may be employed not only in mechanical details but also in the electric control designs, all without departing from the spirit of the invention and the invention is, therefore, not intended to be limited to that precise form beyond the limitations as may be imposed by the following claims.

I claim:

1. In a machine for impregnating articles with a liquid and extracting surplus liquid therefrom, a tank; a basket rotatably mounted in the tank; a motor for driving the basket; a cover for the tank, latch means retaining the cover in closed position; electro-magnetic, latch-locking means; timing means for controlling duration of operation of said driving motor; electric circuits from a power source containing said driving motor, latch-locking means, and timing means, and a switch normally returning to an open position controlling all of said circuits and being closed by closure of said cover to close all of said circuits.

2. In a machine for impregnating articles with a liquid and extracting surplus liquid therefrom, a tank; a basket rotatably mounted in the tank; a motor for driving the basket; a cover for the tank, latch means retaining the cover in closed position; electro-magnetic, latch locking means; timing means for controlling duration of operation of said driving motor; electric circuits from a power source containing said driving motor, latch-locking means, and timing means, and a switch normally returning to an open position controlling all of said circuits and being closed by closure of said cover to close all of said circuits, a liquid supply tank; a sump; a discharge pipe from said basket tank to said sump; a pump returning liquid from the sump to said supply tank; and a pump driving motor in a circuit also controlled by said switch to operate upon closure thereof.

3. In a machine for impregnating articles with a liquid and extracting surplus liquid therefrom, a tank; a basket rotatably mounted in the tank; a motor for driving the basket; a cover for the tank, latch means retaining the cover in closed position; electro-magnetic, latch-locking means; timing means for controlling duration of operation of said driving motor; electric circuits from a power source containing said driving motor, latch-locking means, and timing means, and a switch normally returning to an open position controlling all of said circuits and being closed by closure of said cover to close all of said circuits, a liquid supply tank; a sump; a discharge pipe from said basket tank to said sump; a pump returning liquid from the sump to said supply tank; and a pump driving motor in a circuit also controlled by said switch to operate upon closure thereof; said discharge pipe leaving the floor of said basket tank substantially tangentially thereof in the direction of rotation of said basket.

4. In a machine for impregnating articles with a liquid and extracting surplus liquid therefrom, a tank; a basket rotatably mounted in the tank; a motor for driving the basket; a cover for the tank, latch means retaining the cover in closed position; electro-magnetic, latch-locking means; timing means for controlling duration of operation of said driving motor; electric circuits from a power source containing said driving motor, latch-locking means, and timing means, and a switch normally returning to an open position controlling all of said circuits and being closed by closure of said cover to close all of said circuits; said timing means having a mechanical connection with said cover; reset means operable upon opening of the cover; said mechanical connection cooperating with said timing means and overcoming said reset means; and a switch in said driving motor and latch-locking means circuits opened following a predetermined operation of said timing means.

5. In a device for centrifuging volatile liquids, some of the vapors of which are heavier than air, a tank, a basket rotatably carried in the tank in proximity to the tank wall, a cover sealing the tank, means for rotating the basket, and a discharge conduit leading substantially tangentially from the tank floor in the direction of rotation of the basket, whereby vapors may be thrown to said wall by the basket to condense and currents induced by rotation of the basket will tend to induce flow of the heavier uncondensed vapors out through said conduit.

6. In a device for centrifuging volatile liquids, some of the vapors of which are heavier than air, a tank, a basket rotatably carried in the tank in proximity to the tank wall, a cover sealing the tank, means for rotating the basket, and a discharge conduit leading substantially tangentially from the tank floor in the direction of rotation of the basket, whereby vapors may be thrown to said wall by the basket to condense and currents induced by rotation of the basket will tend to induce flow of the heavier uncondensed vapors out through said conduit, means supporting said basket at the bottom of said tank, and said cover having a pilot entering the top end of the basket.

7. In an extracting system containing at least two centrifuges each having a rotatable basket, a motor for driving the basket, and a cover shiftable to open and closed positions over the basket, a sump receiving discharge from all of the centrifuges, a liquid tank, a pump for taking liquid from the sump and placing it in the tank, and an electric control system preventing operation of any centrifuge when its cover is open and causing operation of the pump only when a centrifuge is operating, said control system comprising a switch for each centrifuge normally open and closed by bringing the centrifuge cover to a closed position, a circuit from each cover switch to its respective centrifuge basket driving motor, timing means for each centrifuge resettable by travel of said cover, a timing switch for each timing means included in each respective motor-cover switch circuit, a motor for driving said pump, said pump motor being normally in one of said driving motor-cover switch circuits, and a relay in the other driving motor-cover switch circuit for transferring the pump motor to that other circuit upon energization thereof.

ERNEST SPICKELMIER.
CARL W. BRUENGER.
FORREST L. HITCHCOCK.